Figure 6:
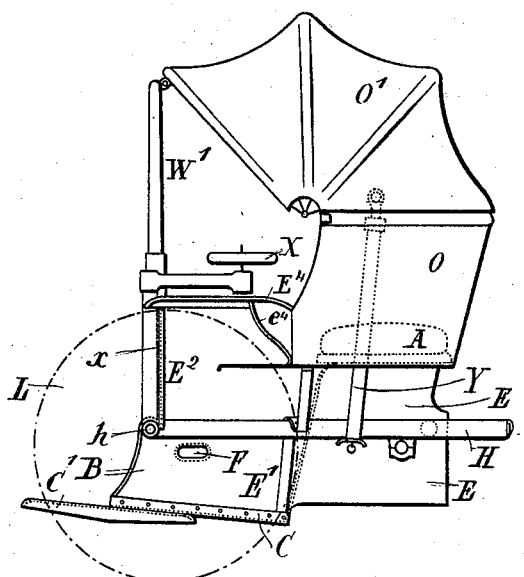

No. 627,842. Patented June 27, 1899.
G. V. L. CHAUVEAU.
MOTOR VEHICLE.
(Application filed June 23, 1898.)
(No Model.) 3 Sheets—Sheet 1.
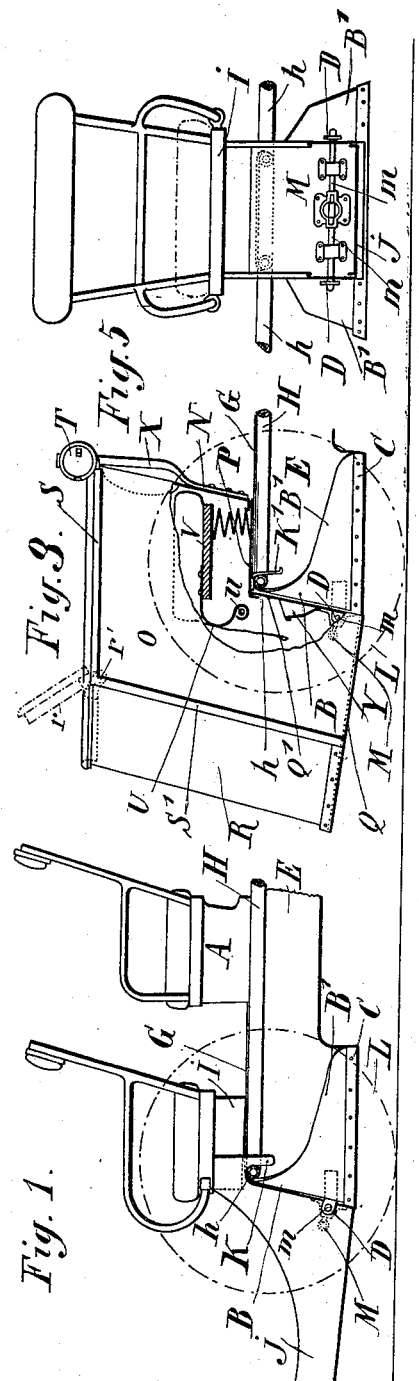
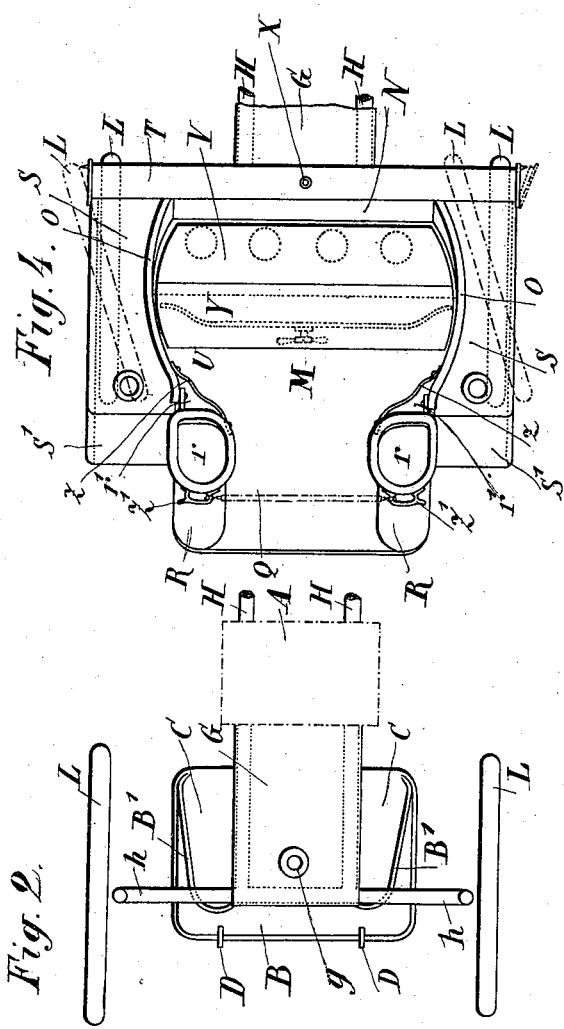
WITNESSES.
INVENTOR:
G. V. L. Chauveau.
BY
ATTORNEYS No. 627,842. Patented June 27, 1899.
G. V. L. CHAUVEAU.
MOTOR VEHICLE.
(Application filed June 23, 1898.)

(No Model.) 3 Sheets—Sheet 2.

WITNESSES.

INVENTOR:
G. V. L. Chauveau.
BY
ATTORNEYS.

No. 627,842. Patented June 27, 1899.
G. V. L. CHAUVEAU.
MOTOR VEHICLE.
(Application filed June 23, 1898.)
(No Model.) 3 Sheets—Sheet 3.

WITNESSES.

INVENTOR:
G. V. L. Chauveau,
BY
ATTORNEYS.

UNITED STATES PATENT OFFICE.

GUSTAVE VICTOR LÉON CHAUVEAU, OF PARIS, FRANCE, ASSIGNOR TO LA SOCIÉTÉ ANONYME DES VOITURETTES AUTOMOBILES, OF SAME PLACE.

MOTOR-VEHICLE.

SPECIFICATION forming part of Letters Patent No. 627,842, dated June 27, 1899.

Application filed June 23, 1898. Serial No. 684,300. (No model.)

*To all whom it may concern:*

Be it known that I, GUSTAVE VICTOR LÉON CHAUVEAU, director of La Société Anonyme des Voiturettes Automobiles, of 163 Avenue Victor Hugo, Paris, France, have invented new and useful Improvements in Motor-Vehicles, (for which applications for Letters Patent have been filed in the following foreign countries: France, dated December 11, 1897, No. 273,038; France, Certificates of Addition, dated March 29, 1898, and May 10, 1898, No. 273,038; France, dated December 20, 1897, No. 273,311; Germany, dated January 13, 1898, No. 11,010; Belgium, dated January 24, 1898, No. 133,359; Belgium, Patent of Improvement, dated May 12, 1898, No. 105,840, and Great Britain, dated March 11, 1898, No. 6,046,) of which the following is a full, clear, and exact description.

The present invention has for its object improvements in automotive tricycles of the type intermediate in size between a velocipede and a full-sized road-carriage, such as the autotricycle, the invention of Léon Bollée, patented in the United States of America March 29, 1898, No. 601,545. These improvements relate more particularly to special arrangements of removable seats and parcel-carriers to be mounted at the front of the Bollée tricycle.

Sheet 1 of the accompanying drawings represents the improvements in the front seat, which consist in rendering the seat capable of being quickly dismounted in a simple manner and also in enabling the seat to be quickly converted, if necessary, into a comfortable carriage-body for two passengers. Figure 1 is a longitudinal elevation of the fore part of an autotricyle of the Bollée type provided with seats for two persons. Fig. 2 is a top plan of the same with one seat. Figs. 3 and 4 represent the same part of the carriage as shown in Figs. 1 and 2 arranged for seating three persons. Fig. 5 is an end view of the fore carriage, showing the means of instantly fixing the removable seat for two persons.

In carrying out this part of the improvements the carriage is provided with a single fixed seat A for the driver, from which to steer, regulate the speed, and apply the brake, &c. The carriage terminates in front in an inclined sheet-iron plate B, which is curved at the ends B', so as to partially inclose the foot-board C. At the front of the inclined plate B, near the bottom, are two strong ears D, which are firmly riveted to the frame E, upon which is fixed the seat, as usual. In front of the seat A is a sheet-iron platform G, which rests upon the side bars H of the frame and is also provided with a lamp-socket g. Thus constructed the carriage is relieved of all unnecessary weight and can therefore develop a maximum speed for quick runs, and the view is not obscured in any way.

In order to transform a carriage thus constructed into a two-seat vehicle, a removable front seat I, of sheet-iron, is provided, which is formed in one with its foot-board J. The seat I forms a box for containing various articles and rests upon the platform G, preferably around its edges, so that the weight of the passenger will be borne directly by the side bars H of the frame, the side cheeks being provided with hooked lugs K, which drop onto the front cross-bar $h$, uniting the two side bars H, the axles of the steering-wheels L being mounted on the ends of the cross-bar. By means of this simple hook connection K, the seat and its foot-board will be self-supporting upon the carriage-framing, with the inclined back of said foot-board resting at bottom against the inclined front B. The hooks K fit close against the longitudinal bars H, and the side cheeks of the foot-board J fit between the ears D, so as to retain the seat in position laterally.

In order to fix the seat in place, a fastening M, similar to a casement-fastener, is mounted upon the inner side of the back of the foot-board J, the bolts $m$ $m$ of which fastener traverse the side cheeks of the foot-board and when shot out engage in the ears D, so as to secure the seat I J to the carriage. This mode of connection presents all the security desired, as the bolt mechanism is entirely uninfluenced by the vibration of the carriage in traveling and remains in the locked position in which it has been placed. This double fitting arrangement and locking of the seat on the carriage possesses the advantage of enabling the operation of placing or removing the seat to be instantly performed, so that the additional time occupied in preparing for a journey is quite insignificant and a traveler would not hesitate to avail himself of this opportunity of converting the vehicle into a single or double seat form, according as he desires to travel alone or in company.

A removable front seat for two persons may be provided instead of a single one. This seat may be variously upholstered and arranged for comfort and constitutes, in effect, a carriage-body placed in front of the carriage instead of the single seat shown in Fig. 1. This body consists, as shown in Figs. 3 and 4, of a sheet-metal casing bent to form the back N and sides O, which are riveted to a bottom P, that rests on the platform G of the vehicle, the sides O being extended forward and downward to support the floor or foot-board Q of the carriage-body, which is connected by a sloping back plate Q' with the bottom P. The entrance is at the front, and it is flanked by two long sheet-iron receptacles R, closed at bottom and provided at top with covers $r$, hinged at $r'$. At the sides O are placed mud guards or wings, the horizontal part S of which is at the level of the top edge of the sides O, and the inclined surface S' is just behind the receptacles R. The sides O of the body are so curved as to allow the steering-wheels L to be swiveled, as may be required, as shown in Fig. 4, and the mud-guards S S' are made broad enough to catch the mud in all positions of the wheel. The upper end of the back N and the ends of the mud-guards S are riveted to a sheet-iron tube T, extending transversely across the back of the seat and closed at the ends by means of hinged caps. The seat is formed of a plank V and a half-round sheet-iron plate U, forming the front of the seat and having its lower edge bent to form a tube to receive an iron rod $u$, whose ends are supported in and traverse the sides O of the body and are secured by cotter-pins. The seat-bottom V rests upon helical springs placed between it and the bottom P, so as to afford an elastic support for the seat under the jolting of the vehicle. At the middle of the tubular rail of the seat-back, upon its upper surface, is provided a socket X, in which may be fitted the handle of an umbrella or awning for sheltering the riders and which may extend sufficiently far to protect the driver on the back seat. The fixing and dismounting of the seat are effected in a similar manner to that described for the first arrangement of seat I J. For this purpose to the under side of the bottom-plate P are secured two hooks K', similar to those, K, before described, which engage the cross-bar $h$ close alongside the platform G. Similarly the back Q' bears against the front B, while the ears D on the latter pass through apertures in the back Q' and are engaged by the bolts of a casement-fastener M, mounted on the back Q', so as to firmly fix the body to the vehicle. In order to stiffen the plate Q' transversely, a sheet-metal trough Y is riveted to its front face, which serves as a receptacle for small articles. The receptacles R, before referred to, also serve to protect the front passengers in the event of collision with another vehicle or obstacle, and from their position they are the first to receive the shock, and being made of sheet-iron and hollow the shock will not be transmitted rearward, the receptacles alone receiving the injury. The tubular back-rail T also contributes to the strengthening of the back N and mud-guards S, and, moreover, by its connection with S and N it imparts great rigidity to the entire body by preventing bulging of the sides O, which are only connected at the front by the bottom of the body, the mud-guards acting as ribs or stiffeners for preventing the spreading of the sides of the body. The removable body may be upholstered on the seat, back, and top of the mud-guards, which serve as arm-rests. Stick-holders Z may be provided at the inside corners of the seat-frame, in rear of the receptacles R, at the front of which handles Z' may be provided, to which may be hooked a strap on which may be hung jingling bells. The covers $r$ are cupped and when in the closed position form trays. The seat, back, and elbow-rest cushions and the seat, as well as the other accessories, are readily removable, leaving only a sheet-iron casing, which may be readily washed outside and in, as is also the case in respect of the single seat described with reference to Fig. 1.

Figure 7:
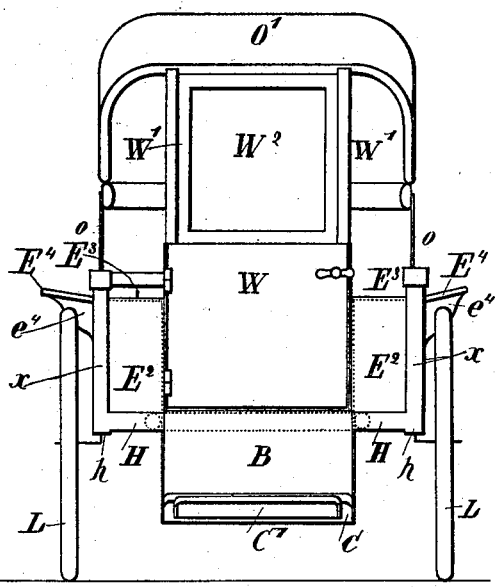
Figure 8:
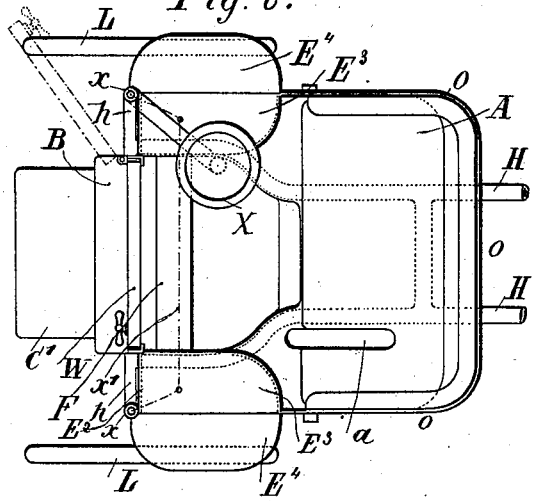
Figure 9:
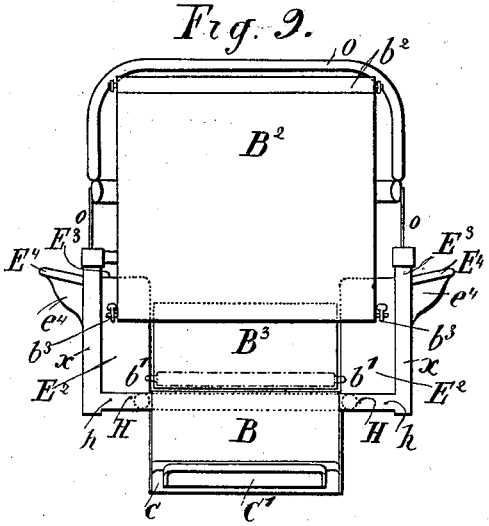

In Sheet 2 I have represented an autocar of the Bollée type provided with a single fixed seat, (in lieu of the back seat of the Bollée car, of which the front seat is dispensed with altogether,) the seat being so arranged as to afford all requisite comfort and shelter, while retaining within reach the driving and steering mechanism. Fig. 6 is a front side elevation of the vehicle, showing the improved seat. Figs. 7 and 8 are a front elevation and plan. Fig. 9 shows a modification.

In this case the improved seat is intended for the driver of the vehicle and must therefore be in the proper position to bring the steering-wheel X and the handing-lever Y of the motor within reach. In order to afford the degree of comfort required, the configuration of the tubular frame of the vehicle is modified by splaying outward the side bars H at the front ends where they are connected to the cross-tube $h$. Upon the frame thus modified in form is mounted a carriage-body of sheet-iron of the form shown, which rests upon the casing E, inclosing the driving mechanism, the casing being extended forward within the laterally-splayed ends of the side bars H to form a foot-box E', surmounted by an entrance-door. The seat-body O considerably overhangs the side bars H and is upholstered, the bottom A, forming the driver's seat, being provided with a slot $a$, through which the handing-lever Y, placed at the left hand of the driver, passes. The foot-box E', which is placed between the splayed ends of the side bars H, is carried upward approximately as high as the tubular columns $x$, in which the steering-wheel spindles L are pivoted, the connecting-rod $x'$, by which the levers of the steering-spindles are coupled, being contained within a transverse flattened tubular casing F', fixed to the sides the foot-box E'. The foot-box E' is inclosed at front between the floor C and cross-tube $h$ by a sheet-metal plate B and is provided with a forwardly-projecting step C', upon which to mount in order to stride over the tubes $h$ and F in entering the vehicle. The forward and top edges of the sides E' of the casing E are bent outward at right angles to form vertical and horizontal panels $E^2 E^3$, respectively, the latter panels being extended at $E^4$ to form mud-guards above and toward the rear of the wheels L to intercept mud thrown up, the mud-guards $E^4$ being supported by means of sheet-iron brackets $e^4$. The carriage-body O may be surmounted by a folding hood O', capable of being raised or lowered in the ordinary way.

The entrance to the seat-body may be closed, as shown in Figs. 6 to 9, by a door W, provided, if desired, with jointed uprights W', which may be erected for the purpose of being attached to the hood O' and which serve to carry a front window $W^2$, of glass, for protecting the rider from the wind or driving rain. The entrance to the foot-box may be closed, as shown in Fig. 9, by a panel $B^3$, pivoted at $b'$, which panel when raised to a vertical position (and there held by any suitable means) forms a door, and when lowered inward, so as to rest upon the cross-tube F, for example, forms a small seat for seating a second passenger in the entrance, with his feet upon the front step C'. Instead of a glass panel W $W^2$ a blind of transparent fabric B, Fig. 9, may be used, suspended on a spring or other roller $b^2$ from the hood O' and secured by hooking at bottom $b^3$ to the front panels $E^2$, and thus form another kind of shelter for a single passenger.

The above arrangement of seat, with its accessories in detail, constitutes an important improvement in automotive tricycles of the type hereinbefore specified by affording the passenger, even if of stout build, a comfortable seat, such as has never hitherto been obtainable in consequence of the difficulty of reconciling the difference between the restricted dimensions of a light automotor-tricycle of the Bollée type with the roomy proportions of a comfortable carriage in which the passenger finds ease, comfort, and shelter and even room for luggage, as by the improved construction of carriage-body described a single passenger is provided with even more than the necessary accommodation, besides which he can carry with him several parcels without being incommoded.

The removable front seat may also be replaced by a box or casing for carrying goods or parcels for tradesmen's use, which casing may be readily detached when no longer required, thus enabling the carriage to be used for various purposes, whereas ordinary parcel-carriers of this kind are necessarily restricted to one particular use, owing to the box or casing being a fixture.

Figure 10:
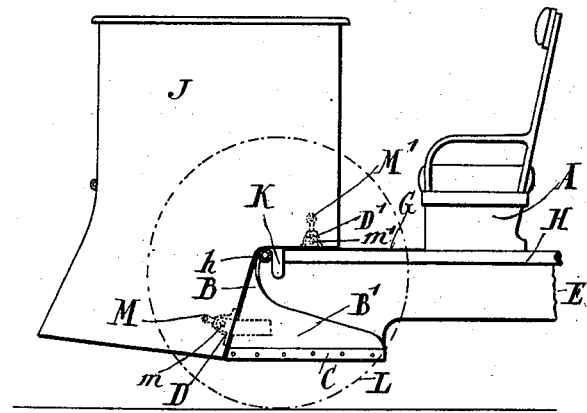
Figure 11:
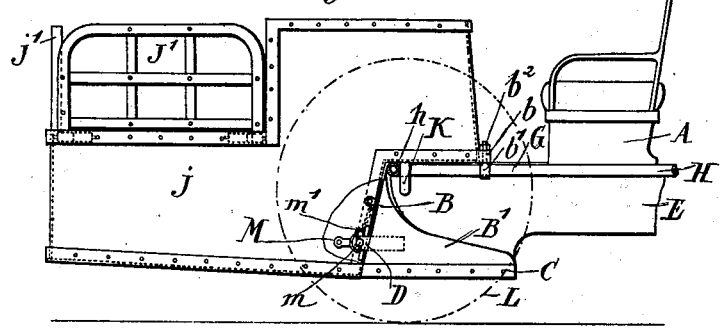
Figure 12:
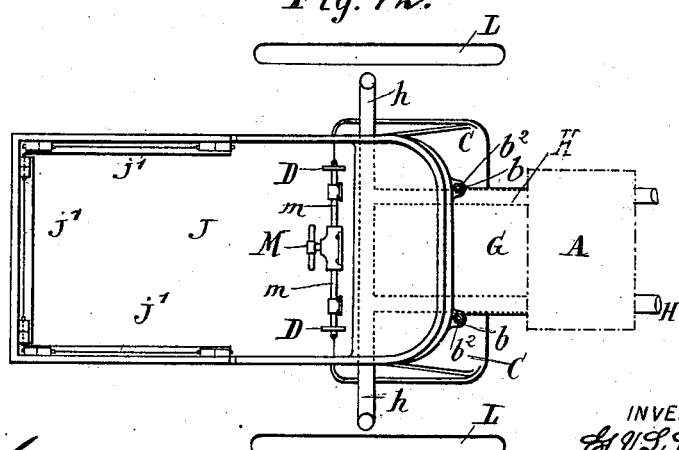

Sheet 3 of the drawings illustrates two arrangements of parcel-carriers. Fig. 10 shows the fore part of a carriage of the Bollée type having a removable goods-receptacle J, attached by means of ears D, projecting at front of the inclined plate B, before referred to, which ears pass through apertures in box J and are secured by means of the bolts $m$ of a fastener M, mounted within said box, engaging in ears D. An additional fastener M' may also in some cases be provided, the bolts $m'$ of which engage in other apertured ears D' on the carriage-platform G. In combination with the above an additional means of connection may also be afforded by hooked lugs K, fitting onto the cross-bar $h$ of the carriage-frame, as hereinbefore described. By this triple means of fixing perfect stability of the box J at the front of the carriage is insured, and the box can be loaded with parcels up to the full extent which the carriage is capable of supporting. Only one bolt-fastener M may be used in combination with hooked lugs K, or two bolt-fasteners may be employed without any hooked lugs. The form and dimensions of the box J may be varied, as also the position and arrangement of the doors for giving access to its interior, the right being reserved of making such modifications as may be deemed necessary, according to circumstances. Figs. 11 and 12 represent a longitudinal elevation and plan of the fore part of the vehicle converted into a parcel-carrier constructed of an open truck-body J, of sheet metal, wood, or other material, of the form shown or otherwise. The body J may, if desired, be provided with hinged side panels J', capable of being erected, as shown, for enabling parcels to be carried when piled above the sides of the truck, the flaps being folded down on the inside of the body when not required for use. As in the preceding arrangements, the parcel-carrier is supported upon the fore part of the automotive vehicle by a horizontal part resting upon the platform G and also by means of an inclined part which rests against the sloping front B of the motor-vehicle, the attachment of the carrier being instantly effected with the aid of the forks K, fitting upon the cross-tube $h$ of the carriage-framing. The parcel-carrier is also, as in the preceding case, additionally secured by means of the fastener M, mounted within the truck-body, the bolts $m$ of which fastener engage in ears D, projecting from the inclined front plate B of the carriage-framing.

In order to still further increase the stability of the different forms of parcel-carriers, as well as of the several kinds of seats before described as being mounted upon the carriage, I employ an additional means of fastening, which consists in firmly fixing to the rear part of the parcel-carrier or seat two lugs $b$, in which screw two hooked bolts $b'$, whose hooks embrace the under side of the side bars H of the carriage, so that by simply tightening the nuts $b^2$ an absolutely rigid connection between the removable carrier or seat and the carriage-frame is obtained.

I claim—

1. In a rear-driving automotor-tricycle of the type specified, the arrangement of removable seat and foot-board in one adapted to be detachably connected to the machine by hooks K engaging a cross-bar of the frame and bolt-fasteners M $m$ connecting the seat and foot-board with the frame below the hooks, substantially as specified.

2. In a rear-driving automotor-tricycle of the kind specified, the combination of a removable carriage-body for seating two passengers, provided with luggage-receptacles R which also serve for protecting the passengers in case of collisions; with a tubular back rail T also serving to contain parcels as well as to stiffen the upper part of the carriage-body; and the mud-guards S forming ribs for stiffening the body laterally, substantially as specified.

3. In a rear-driving automotor-tricycle of the type specified, the combination with the framing of the machine having splayed side-bars H, of a carriage-body permanently fixed thereto having its foot-box between the splayed ends of said bars, the foot-board being traversed by a cross-tube F through which the connecting-rod $x'$ passes, and provided with a front step C' for enabling the vehicle to be entered by stepping over the cross-tubes $h$ and F, the entrance to the body being closed by a door W connected to the hood O' for protecting the passengers and closing the entrance to the seat, or with a fall-down flap B' adapted to form a seat, the upper part of the door being provided with a window or a transparent blind $B^2$ and attachments $b^3$, substantially as described.

4. In a rear-driving automotor-tricycle of the type specified, the combination with the framing of the machine, of a removable goods-receptacle, and means for engaging a front cross-bar of the framing and bolts for locking the receptacle to the framing below the hooks, whereby the receptacle is adapted to replace the removable front seat so as to enable the carriage to be used either for carrying passengers or merchandise as described.

5. In a rear-driving automotor-tricycle of the type specified, the combination with the framing of the machine, of a removable truck or carrier having hinged side flaps constructed and arranged as described.

6. In a rear-driving automotor-tricycle of the type specified, the combination with the frame, of a seat or parcel-carrier provided with hooks for engaging a cross-bar of the frame, bolt-fasteners for connecting the lower part of the seat or parcel-carrier with the frame, and hook-bolts for engaging the side bars of the frame, substantially as described.

7. In a rear-driving automotor-tricycle of the type specified, the combination with the frame, of a seat and foot-board provided with hooks for engaging a front cross-bar of the frame, and means for connecting the lower rear part of the seat and foot-board with the front part of the frame, substantially as described.

8. In a rear-driving automotor-tricycle of the type specified, the combination with the frame provided with ears projecting from its front lower portion, of a seat and foot-board provided with hooks engaging a front cross-bar of the frame, and having the side cheeks of its foot-board fitting between the said ears, and bolts on the back of the foot-board and adapted to pass through the cheeks of the foot-board into engagement with the said ears, substantially as described.

9. In a rear-driving automotor-tricycle of the type specified, a removable carriage-body provided with vertical luggage-receptacles at the front, one at each side, said receptacles serving as guards for protecting the passengers in case of collision, as set forth.

10. In a rear-driving automotor-tricycle of the type specified, a body, a seat, a folding hood, and a closure for the body said closure extending to the top of the hood, substantially as described.

GUSTAVE VICTOR LÉON CHAUVEAU.

In presence of—
 JULES MATHIEW,
 GEORGES COLLOTE.